(12) United States Patent
Fukuura

(10) Patent No.: US 9,376,579 B2
(45) Date of Patent: Jun. 28, 2016

(54) INTAGLIO PRINTING INK

(75) Inventor: Asao Fukuura, Yokosuka (JP)

(73) Assignee: National Printing Bureau, Incorporated Administrative Agency, Minato-Ku (JP)

( * ) Notice: Subject to any disclaimer, the term of this patent is extended or adjusted under 35 U.S.C. 154(b) by 0 days.

(21) Appl. No.: 13/501,904

(22) PCT Filed: Oct. 8, 2010

(86) PCT No.: PCT/JP2010/067752
§ 371 (c)(1),
(2), (4) Date: Apr. 13, 2012

(87) PCT Pub. No.: WO2011/046083
PCT Pub. Date: Apr. 21, 2011

(65) Prior Publication Data
US 2012/0199029 A1 Aug. 9, 2012

(30) Foreign Application Priority Data

Oct. 16, 2009 (JP) ................................. 2009-238817

(51) Int. Cl.
*B41M 1/10* (2006.01)
*C09D 11/02* (2014.01)
*C09D 11/101* (2014.01)

(52) U.S. Cl.
CPC .................. *C09D 11/02* (2013.01); *B41M 1/10* (2013.01); *C09D 11/101* (2013.01)

(58) Field of Classification Search
None
See application file for complete search history.

(56) References Cited

U.S. PATENT DOCUMENTS 5,858,618 A   1/1999   Tzou

FOREIGN PATENT DOCUMENTS

| EP | 0 588 534 A2 | 3/1994 |
|---|---|---|
| JP | 01-225605 | 9/1989 |
| JP | 08-000892 B2 | 1/1996 |
| JP | 11-021327 A1 | 1/1999 |
| JP | 2002-038065 A1 | 2/2002 |
| JP | 2007-119718 | 5/2007 |
| JP | 2007-145962 A1 | 6/2007 |
| JP | 2009-227702 | 10/2009 |
| JP | 2009-227702 A1 | 10/2009 |
| WO | 03/066759 A1 | 8/2003 |
| WO | 2009/013169 A1 | 1/2009 |

OTHER PUBLICATIONS

International Search Report and Written Opinion dated Nov. 2, 2010.
(Continued)

*Primary Examiner* — Joshua D Zimmerman
(74) *Attorney, Agent, or Firm* — Burr & Brown, PLLC

(57) ABSTRACT

There is provided an intaglio printing ink that causes little set-off, exhibits improved chalking resistance, and attains improved print quality, and which permits low-cost prevention of blocking by low-dose irradiation with ultraviolet light. The intaglio printing ink comprises at least an ultraviolet curable composition, an oxidation polymerizable composition, a photopolymerization initiator, an oxidation polymerization catalyst, and a pigment. An acid-modified epoxy-acrylate prepared by reacting a polybasic acid anhydride with an epoxy-acrylate obtained by reacting an acrylate, having two or more acryloyl groups and one carboxyl group in one molecule, with an epoxy compound, having two or more epoxy rings in one molecule, is used as the ultraviolet curable composition.

3 Claims, 1 Drawing Sheet

(56) References Cited

OTHER PUBLICATIONS

European Search Report (Application No. 10823351.1) mailed Aug. 12, 2014.

Yan Xu, et al., "*Development of Ultraviolet Curing Coating and its Application*," Electroplating and Coating, vol. 19, First Season, Feb. 29, 2000, pp. 23, 47-51 (Abstract).

Chinese Office Action (Application No. 201080055511.3) dated Mar. 10, 2014.

Japanese Office Action (Application No. 2011-536121) mailed Jun. 24, 2014 (with English translation).

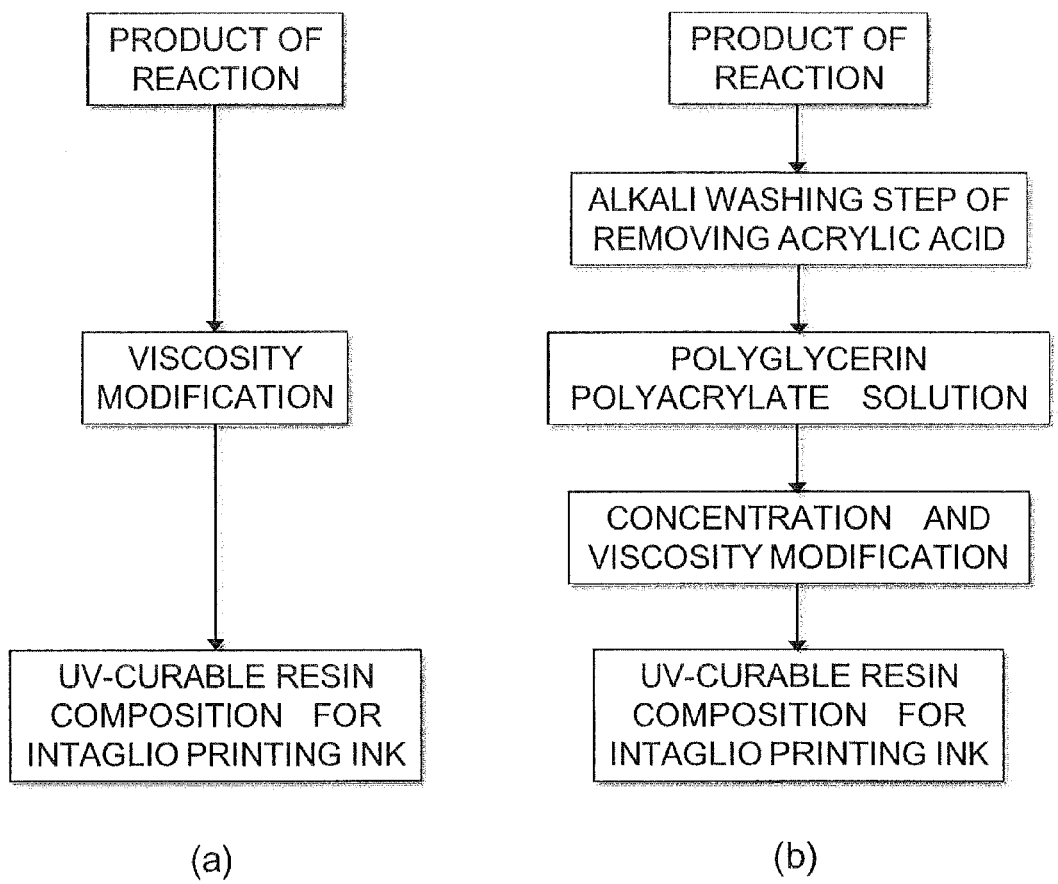

INTAGLIO PRINTING INK

FIELD OF INVENTION

The present invention relates to an intaglio printing ink and more specifically relates to an intaglio printing ink that is used, for example, in security printed matters required to prevent forgery and alteration of bank notes, passports, securities, and postage stamps, as well in the production of art printed matters.

BACKGROUND ART

Due to the nature of bank notes, passports, securities, and postage stamps, they are demanded to be less likely to be forged or altered, and aesthetic elements are also demanded. In order to meet these demands, engraving intaglio printing (hereinafter sometimes referred to simply as "intaglio printing") that can provide excellent finishing of printed matters and involves a complicated plate making process that makes it difficult to forge printed matters is used for the printing of bank notes and the like.

Features of printed matters prepared by the intaglio printing method include unique hand feeling, the realization of formation of fine and sharp image lines, and the difficulty of producing the printed matter without use of special printing machines. For these reasons, intaglio printing is abundantly used for the production of the security printed matters.

The intaglio printing is a printing method that comprises preparing concaved image lines on a metallic printing plate, casting ink on the printing plate to fill the ink into concaves of the image lines, wiping off excess ink present on the intaglio printing plate, transferring the ink on a paper by applying a high pressure.

The maximum depth of concaves in the engraved plate generally reaches 100 μm. However, the ink transferred on the paper is a part of the casted ink, and the thickness of an ink film formed on the paper after the transfer is approximately 10 μm to 40 μm. The thickness of the ink film transferred on the paper is significantly larger than that of ink films obtained by other printing methods.

The intaglio printing ink used in the intaglio printing is produced by kneading a varnish ingredient, which comprises a drying oil-modified alkyd resin as a main component and a solvent and wax incorporated therein, with a pigment.

Further, in the intaglio printing method, as mentioned above, the thickness of ink films formed on printed matters is much larger than that of ink films formed by other printing methods such as offset printing. Accordingly, when printed matters formed by intaglio printing are carried in a mutually superimposed state, transfer of ink in a printed matter onto the backside of another printed matter superimposed on the printed matter, that is, a problem of set-off occurs. Various techniques are used for the prevention of the set-off and examples thereof include 1) a technique in which a slip sheet is inserted into between printed matters, 2) a technique in which a solvent is added to the ink to allow the solvent to be penetrated into the paper to accelerate the deposition of the resin ingredient in the varnish, and 3) a technique in which ink is allowed to stand at room temperature for hardening; in printing, the intaglio printing plate is heated to render the ink flowable and thus to facilitate the transfer of the ink; and, after printing, the flowability of the ink is lost and the adhesion of the ink is reduced.

Further, in the intaglio printing method, the step of wiping off excess ink on the intaglio printing plate is provided. The wiping-off step is carried out by a paper wiping method or a roll wiping method. From the viewpoints of the amount of wastes, printing speed and the like, a roll wiping method is mainly used in a large volume of printing.

The roll wiping method is a method in which excess ink present on the intaglio printing plate is wiped off by a wiping roller that is rotated in a direction opposite to the direction of rotation of a plate cylinder on which an intaglio printing plate has been mounted. The ink deposited on the wiping roller can be continuously wiped off by dispersing or dissolving the ink in an oleaginous solution or a surfactant-containing aqueous solution. The method using the oleaginous solution is called an oleaginous wiping method, and the method using the surfactant-containing aqueous solution is called an aqueous wiping method. The aqueous wiping method is mainly used from the viewpoint of a low load on working environments.

The intaglio printing ink can easily be wiped off by the roll wiping methods. Further, in order that the intaglio printing ink is dispersible or dissolvable in the surfactant-containing aqueous solution, an ink composition containing a varnish composed mainly of a low-viscosity and relatively low-molecular weight drying oil-modified resin is used. In the varnish composed mainly of the low-viscosity drying oil-modified resin, the intermolecular interaction of the varnish is so small that the varnish is likely to be penetrated into the printing paper and, thus, feathering or bleeding are observed in image lines by microscopic examination. This phenomenon leads to a new problem of lowered quality in fine image lines such as fine characters or the like used for forgery prevention purposes.

Increasing an ink drying speed for set-off prevention purposes causes the progress of a reaction for drying of the ink to some extent before ink transfer on the paper, sometimes leading to a failure of ink transfer.

Further, in the intaglio printing ink, the proportion of the varnish component used for ink fixation purposes is relatively lower than the proportion of the varnish component used other printing methods. Accordingly, a high-molecular weight resin component cannot be incorporated at a high mixing ratio in the varnish, and, thus, when image lines of the printed matter are rubbed by paper or the like, the paper is tainted. That is, a problem of chalking occurs. This poses a problem of contamination of a contact portion such as a roller or the like that delivers bank notes in machines that process bank notes at high speed, such as automatic bank note payment machines.

In offset printing in which the thickness of an ink film on paper is about 1 μm, from the viewpoints of preventing set-off of the printed matter and improving an anti-chalking property of the cured ink film, an ultraviolet drying method is extensively used that an ultraviolet curable composition is used as varnish and ultraviolet light is applied to cure the varnish. The application of the ultraviolet drying method to intaglio printing in which the thickness of an ink film on paper is 20 μm or more poses a problem that, when an ink having a high color density is used, the ultraviolet light cannot be permeated into the ink film, resulting in a failure of ink drying.

A drying method utilizing electron beams has been proposed as a method for curing a thick ink film that does not allow ultraviolet light to be permeated thereinto, and this method has been partially put into practical use. The curing method utilizing electron beams is disadvantageous in that an electron beam irradiation apparatus is expensive and nitrogen should be flown for the prevention of inhibition of polymerization by oxygen, leading to a high running cost. Accordingly, the percentage popularization is low. Further, the electron beams break molecules of the paper, and, thus, the strength of the paper is likely to be lowered.

The present applicant has proposed an ink having both ultraviolet curability and oxidation polymerizability and a printed matter using the ink with a view to curing a thick ink film that is not permeable to ultraviolet light (patent document 1). Patent document 1 describes that the use, as an intaglio printing ink, of a varnish comprising a mixture of an ultraviolet curable composition, an oxidation polymerizable composition, a photopolymerization initiator, and an oxidation polymerization catalyst can allow the surface of an ink film after printing to be cured with ultraviolet light to prevent set-off and, at the same time, can allow the interior of the ink film to be brought to a completely cured state by polymerization of the ultraviolet curable composition by radicals generated from the oxidation polymerizable material and the oxidation polymerization catalyst.

The present applicant has proposed a resin composition for an intaglio printing ink that can reduce the so-called blocking phenomenon, that is, a phenomenon that printed matters formed by intaglio printing are fixed to each other in the loading of the printed matters, by using polyglycerin polyacrylate having excellent flexibility and excellent ultraviolet curability as an ultraviolet curable composition, and an ink composition using the resin composition and a printed matter formed from the ink composition (patent document 2).

The present applicant has further proposed use of a solvent-free alkyd resin as an oxidation polymerizable composition (patent document 3).

PRIOR ART DOCUMENTS

Patent Document

[Patent document 1] Japanese Patent Publication No. 892/1996
[Patent document 2] Japanese Patent Application Laid-Open No. 38065/2002
[Patent document 3] Japanese Patent Application Laid-Open No. 145962/2007

DISCLOSURE OF THE INVENTION

Problems to be Solved by the Invention

In patent documents 2 and 3, an epoxy acrylate adduct of a polybasic acid anhydride is exemplified as an ultraviolet curable composition contained in an ink for intaglio printing. The ultraviolet curable composition, however, has low ultraviolet curability, and a high dose of ultraviolet light was necessary for curing. In order to solve this problem, patent document 2 proposes polyglycerin polyacrylate. The polyglycerin polyacrylate, however, has high ultraviolet curability and, thus, can realize high surface curability at a low dose of ultraviolet light, but on the other hand, in an alkali washing step of removing acrylic acid in a varnish production process, the product is hydrophilic and has a high molecular weight and, thus, is likely to be emulsified, leading to a troublesome task in the removal of acrylic acid that incurs a significantly increased cost of the varnish.

Accordingly, an object of the present invention is to provide an intaglio printing ink that utilizes a low-cost and highly ultraviolet curable composition, to which aqueous wiping can be applied, and can realize the prevention of set-off and improved anti-chalking property and print quality.

Means for Solving the Problems

According to the present invention, there is provided an intaglio printing ink comprising at least an ultraviolet curable composition, an oxidation polymerizable composition, a photopolymerization initiator, an oxidation polymerization catalyst, and a pigment, the ultraviolet curable composition comprising an acid-modified epoxy-acrylate prepared by reacting a polybasic acid anhydride with an epoxy-acrylate obtained by reacting an acrylate, having two or more acryloyl groups and one carboxyl group in one molecule, with an epoxy compound having two or more epoxy rings in one molecule.

In a preferred embodiment of the present invention, the acrylate having two or more acryloyl groups and one carboxyl group in one molecule is an acrylate obtained by reacting a dibasic acid anhydride with an acrylate having two or more acryloyl groups and one hydroxyl group in one molecule.

In a preferred embodiment of the present invention, the acrylate having two or more acryloyl groups and one hydroxyl group in one molecule is pentaerythritol triacrylate or dipentaerythritol pentaacrylate.

In a preferred embodiment of the present invention, the dibasic acid anhydride is succinic anhydride or maleic anhydride.

In a preferred embodiment of the present invention, the polybasic acid anhydride is succinic anhydride or maleic anhydride.

According to another aspect of the present invention, there is provided use of the above intaglio printing ink for the preparation of a security printed matter and an art printed matter.

According to a further aspect of the present invention, there is provided a printed matter printed by using the above intaglio printing ink.

Effect of the Invention

The intaglio printing ink according to the present invention contains an ultraviolet curable composition comprising at least an acid-modified epoxy-acrylate prepared by reacting a polybasic acid anhydride with an epoxy-acrylate obtained by reacting an acrylate that has two or more acryloyl groups and one carboxyl group in one molecule with an epoxy compound that has two or more epoxy rings in one molecule. By virtue of this constitution, an intaglio printing ink can be realized that has a low cost, has a high ultraviolet curability, and permits aqueous wiping and is of both an oxidation polymerization type and an ultraviolet curing type.

BRIEF DESCRIPTION OF THE DRAWING

FIG. 1 is a comparison diagram of a process for producing an ultraviolet curable composition for an intaglio printing ink according to the present invention with a process for producing a conventional polyglycerin polyacrylate-containing ultraviolet curable composition for an intaglio printing ink.

BEST MODE FOR CARRYING OUT THE INVENTION

The intaglio printing ink according to the present invention comprises an ultraviolet curable composition, an oxidation polymerizable composition, a photopolymerization initiator, an oxidation polymerization catalyst, and a pigment as indispensable ingredients and is produced by kneading the ingredients by a known method using a commonly used apparatus such as a three-roll mill or a bead mill.

The ultraviolet curable composition contained in the intaglio printing ink according to the present invention comprises at least an acid-modified epoxy-acrylate prepared by reacting a polybasic acid anhydride with an epoxy-acrylate obtained by reacting an acrylate that has two or more acryloyl groups and one carboxyl group in one molecule with an epoxy compound that has two or more epoxy rings in one molecule.

In the acid-modified epoxy acrylate contained in the ultraviolet curable composition used in the intaglio printing ink according to the present invention, unlike a carboxyepoxy acrylate obtained by semi-esterifying a hydroxyl group of a compound, which is generally called epoxy acrylate and obtained by reacting an epoxy compound with acrylic acid, with a polybasic acid anhydride, many acryloyl groups are present in one molecule. As a result, the intaglio printing ink according to the present invention has high ultraviolet curability.

The acrylate that has two or more acryloyl groups and one carboxyl group in one molecule can be produced by semi-esterifying an acrylate that has two or more acryloyl groups and one hydroxyl group in one molecule with a dibasic acid anhydride.

The acrylate that has two or more acryloyl groups and one hydroxyl group in one molecule is preferably pentaerythritol acrylate or dipentaerythritol pentaacrylate. These materials are available from the market. The pentaerythritol acrylate is a commercially available as a mixture with pentaerythritol tetraacrylate. Examples thereof include Aronix M-306 (manufactured by Toa Gosei Chemical Industry Co., Ltd.), Viscoat #300 (manufactured by Osaka Organic Chemical Industry Ltd.), Light Acrylate PE-3A (manufactured by Kyoeisha Chemical Co., Ltd.), NK Ester A-TMM-3L (manufactured by Shin-Nakamura Chemical Co., Ltd.), and Kayarad PET-30 (manufactured by Nippon Kayaku Co., Ltd.). The dipentaerythritol pentaacrylate is commercially available as a mixture with dipentaerythritol hexaacrylate and dipentaerythritol tetraacrylate, and examples thereof include Aronix M-403 (manufactured by Toa Gosei Chemical Industry Co., Ltd.), Light Acrylate DPE-6A (manufactured by Kyoeisha Chemical Co., Ltd.), and KayaradDPHA (manufactured by Nippon Kayaku Co., Ltd.).

Examples of dibasic acid anhydrides usable for the reaction with the acrylate that has two or more acryloyl groups and one hydroxyl group in one molecule include maleic anhydride, succinic anhydride, itaconic anhydride, citraconic anhydride, phthalic anhydride, 1,2,3,6-tetrahydrophthalic anhydride, 3,4,5,6-tetrahydrophthalic anhydride, hexahydrophthalic anhydride, 4-methyl hexahydrophthalic anhydride, 3-methyl-1,2,3,6-tetrahydrophthalic anhydride, 4-methyl-1,2,3,6-tetrahydrophthalic anhydride, and methyl-3,6-endomethylene-1,2,3,6-tetrahydrophthalic anhydride. Among them, maleic anhydride and succinic anhydride are particularly preferred.

The product of the reaction of the acrylate that has two or more acryloyl groups and one hydroxyl group in one molecule with the dibasic acid anhydride can be obtained, for example, by a reaction in the absence of a solvent or in a hydrophilic ultraviolet curable material. Examples of hydrophilic ultraviolet curable materials usable herein include water soluble acrylates or acryloylmorpholines, for example, polyethylene glycol diacrylate and glycerin ethylene oxide-added triacrylate. The use of a catalyst is preferred from the viewpoint of accelerating the reaction. Catalysts usable in the reaction include, for example, dimethylaminopyridine, triethylamine, dimethylbenzylamine, and triethylammonium chloride. The amount of the catalyst used is 0.1 to 10% by mass based on the reaction product. The reaction temperature is 60 to 150° C. The reaction time is 1 to 24 hr.

In the reaction, from the viewpoint of preventing thermal polymerization, blowing of air or oxygen or the addition of thermal polymerization inhibitor into the reaction system is preferred. The amount of the thermal polymerization inhibitor added is 0.01 to 0.2% by mass based on the reaction product. Examples of such thermal polymerization inhibitors include hydroquinone, methylhydroquinone, and hydroquinone monomethyl ether.

In the present invention, the epoxy compound used in the production of the ultraviolet curable composition is a compound that has two or more epoxy rings in one molecule. A lower epoxy equivalent of the epoxy compound is preferred from the viewpoint of increasing the content of the acryloyl group, and the epoxy equivalent is preferably approximately not more than 300 g/equivalent. When the epoxy equivalent is not less than 300 g/equivalent, the ultraviolet curability is sometimes lowered.

Specific examples of epoxy compounds that has two or more epoxy rings in one molecule include bisphenol A epoxy resins, bisphenol F epoxy resins, phenol novolak epoxy resins, cresol novolak epoxy resins, biphenol epoxy resins, hydrogenated bisphenol A epoxy resins, glycidyl ethers of polyhydric alcohols, and glycidyl esters of polycarboxylic acids.

The epoxy compounds may be commercially available products. Examples of such bisphenol A epoxy resins include jER828 (manufactured by Japan Epoxy Resins Co., Ltd.), EPOTOHTO YD-127 and YD-128 (manufactured by Tohto Kasei Co., Ltd.), and Epiclon 840 and 850 (manufactured by DIC). Examples of such bisphenol F epoxy resins include jER806 (manufactured by Japan Epoxy Resins Co., Ltd.), EPOTOHTO YDF-170 (manufactured by Tohto Kasei Co., Ltd.), and Epiclon 830 (manufactured by DIC).

Examples of such phenol novolak epoxy resins include jER152 and jER154 (manufactured by Japan Epoxy Resins Co., Ltd.), EPOTOHTO YDPN-638 (manufactured by Tohto Kasei Co., Ltd.), and Epiclon N-740 (manufactured by DIC). Examples of such cresol novolak epoxy resins include EPOTOHTO YDCN-701, YDCN-702, YDCN-703 and YDCN-704 (manufactured by Tohto Kasei Co., Ltd.), Epiclon N-665 and N-670 (manufactured by DIC), and EOCN-104S (manufactured by Nippon Kayaku Co., Ltd.).

Examples of such hydrogenated bisphenol A epoxy resins include YX8000 and YX8034 (manufactured by Japan Epoxy Resins Co., Ltd.), SUNTOHTO ST-3000 (manufactured by Tohto Kasei Co., Ltd.), SR-HBA (manufactured by SAKAMOTO YAKUHIN KOGYO CO., LTD.), and Epolight 4000 (manufactured by Kyoeisha Chemical Co., Ltd.).

Examples of glycidyl ethers of polyhydric alcohols include sorbitol polyglycidyl ether, sorbitan polyglycidyl ether, polyglycerol polyglycidyl ether, pentaerythritol polyglycidyl ether, trimethylolpropane polyglycidyl ether, resorcin diglycidyl ether, neopentyl glycol diglycidyl ether, ethylene glycol diglycidyl ether, polyethylene glycol diglycidyl ether, propylene glycol diglycidyl ether, polypropylene glycol diglycidyl ether, and 1,6-hexanediol diglycidyl ether. The glycidyl ethers of polyhydric alcohols may be commercially available products, and suitable examples thereof include Denacol series (manufactured by Nagase ChemteX Corporation) and Epolight series (manufactured by Kyoeisha Chemical Co., Ltd.), and SR series (manufactured by SAKAMOTO YAKU-HIN KOGYO CO., LTD).

Examples of glycidyl esters of polycarboxylic acids include adipic acid diglycidyl ester (Denacol EX-701 manufactured by Nagase ChemteX Corporation), o-phthalic acid diglycidyl ester (Denacol EX-721 manufactured by Nagase ChemteX Corporation).

The reaction of the acrylate that has two or more acryloyl groups and one carboxyl group in one molecule with the epoxy compound that has two or more epoxy rings in one molecule is carried out, for example, in the absence of a solvent or in a hydrophilic ultraviolet curable material. Examples of hydrophilic ultraviolet curable materials usable herein include water soluble acrylates or acryloylmorpholines, for example, polyethylene glycol diacrylate and glycerin ethylene oxide-added triacrylate. The use of a catalyst is preferred for reaction acceleration purposes. Catalysts usable herein include dimethylaminopyridine, triethylamine, and dimehylbenzylamine, triethylammonium chloride. The amount of the catalyst used is 0.1 to 10% by mass based on the reaction product. The reaction temperature is 60 to 150° C. The reaction time is 3 to 24 hr.

In the reaction, from the viewpoint of preventing thermal polymerization, blowing of air or oxygen or the addition of thermal polymerization inhibitor into the reaction system is preferred. The amount of the thermal polymerization inhibitor added is 0.05 to 0.2% by mass based on the reaction product. Examples of such thermal polymerization inhibitor include hydroquinone, methylhydroquinone, and hydroquinone monomethyl ether.

The equivalent ratio of the epoxy group to the carboxyl group in the epoxy compound is preferably 1:1 or more. When gelation does not occur in the reaction with the polybasic acid anhydride in the next step, the equivalent of the carboxyl group may be less than 1.

An acid-modified epoxy acrylate is obtained by reacting a polybasic acid anhydride with an epoxy acrylate obtained by reacting an acrylate that has two or more acryloyl groups and one carboxyl group in one molecule with an epoxy compound that has two or more epoxy rings in one molecule. The polybasic acid anhydride used in this reaction may be the same as or different from the dibasic acid anhydride to be reacted with the acrylate that has two or more acryloyl groups and one carboxyl group in one molecule. Specific examples thereof include dibasic acid anhydrides such as maleic anhydride, succinic anhydride, itaconic anhydride, citraconic anhydride, phthalic anhydride, 1,2,3,6-tetrahydrophthalic anhydride, 3,4,5,6-tetrahydrophthalic anhydride, hexahydrophthalic anhydride, 4-methyl hexahydrophthalic anhydride, 3-methyl-1,2,3,6-tetrahydrophthalic anhydride, 4-methyl-1,2,3,6-tetrahydrophthalic anhydride, and methyl-3,6-endomethylene-1,2,3,6-tetrahydrophthalic anhydride; and tribasic acid anhydrides such as trimellitic anhydride. Among them, maleic anhydride and succinic anhydride are particularly preferred.

The reaction between the epoxy acrylate and the polybasic acid anhydride may be carried out under the same reaction conditions as those in the reaction between the acrylate that has two or more acryloyl groups and one carboxyl group in one molecule and the dibasic acid anhydride.

As shown in FIG. 1(a), as with commonly used epoxy acrylates, what is required of the resultant semi-ester of the epoxy acrylate with the polybasic acid anhydride before use is merely to modify the viscosity to a value suitable as a varnish for intaglio printing inks. There is no need to perform purification such as removal of acrylic acid unlike polyglycerin polyacrylate that can realize high UV curability as shown in FIG. 1(b), and, thus, an increase in cost by the purification step is not incurred. The hydrophilic ultraviolet curable material for viscosity modification may be properly selected from publicly known various hydrophilic ultraviolet curable materials. For example, water soluble acrylates or acryloylmorpholines such as polyethylene glycol diacrylate and glycerin ethylene oxide-added triacrylate are usable.

The oxidation polymerizable composition contained in the intaglio printing ink according to the present invention may be a drying oil or a semi-drying oil or a publicly known alkyd resin derived therefrom.

The photopolymerization initiator contained in the intaglio printing ink according to the present invention may be commercially available various photopolymerization initiators. They may be used either solely or in a combination of two or more of them. The content of the photopolymerization initiator may vary depending upon the type of the photopolymerization initiator. In addition to the photopolymerization initiator, photopolymerization initiation assistants such as ethyl 4-dimethylaminobenzoic acid or isoamyl 4-dimethylaminobenzoic acid may be added.

Metal compounds such as cobalt, manganese, and lead, cobalt borate, cobalt octylate, and cobalt naphthenate, and lead monoxide may be mentioned as the oxidation polymerization catalyst contained in the intaglio printing ink according to the present invention.

By virtue of the incorporation of the ultraviolet curable composition in the intaglio printing ink according to the present invention, upon ultraviolet irradiation, the surface of an intaglio printing ink film on paper is cured, and, in the interior of the intaglio printing ink film remaining uncured, the ultraviolet curable composition is gradually polymerized by radicals generated by the oxidation polymerizable composition and the oxidation polymerization catalyst, whereby the ink can be spontaneously and completely dried.

Basic pigments such as calcium carbonate cannot be used as the pigment in the intaglio printing ink according to the present invention because the ultraviolet curable composition contains an acidic substance containing a carboxyl group. However, neutral or acidic pigments used in publicly known ultraviolet curable inks other than the basic pigments may be used. In publicly known ultraviolet curable ink compositions, the incorporation of a large amount of pigments that are likely to absorb ultraviolet light has been difficult. By contrast, in the intaglio printing ink according to the present invention, the interior of the ink film remaining uncured is gradually dried by virtue of the presence of an oxidation polymeriable material, and, thus, even pigments that are likely to absorb ultraviolet light can be incorporated in a large amount.

An intaglio printing mechanism that has hitherto been known as such can be used as an apparatus for the production of printed matters using the intaglio printing ink according to the present invention, that is, an apparatus that can perform a series of steps such as casting of the intaglio printing ink on the intaglio printing plate, wiping-off of excess ink, and printing. Since the main component of the varnish ingredient in the intaglio printing ink is acrylate, in some cases, a transfer roller formed of a material compatible with the acrylate is necessary. An ultraviolet irradiation apparatus for the application of ultraviolet light on the paper may be mentioned as an apparatus that should be further added to the intaglio printing mechanism for the production of printed matters using the intaglio printing ink according to the present invention.

An ultraviolet irradiation apparatus used in offset printing may be used here. The dose of the ultraviolet light may vary depending upon printing speed and surface curability of the intaglio printing ink, that is, the curability of the ultraviolet curable composition. At a printing speed of approximately 100 m/min, two metal halide lamps of 160 W/cm (dose) are necessary. When a commonly known ultraviolet curable composition using a semi-ester of an epoxy acrylate with an acid anhydride is used, at a printing speed of 100 m/min, at least four metal halide lamps of 160 W/cm (dose) are necessary, whereas, in the present invention, the number of metal halide lamps necessary for curing the intaglio printing ink is half or less of the number of metal halide lamps necessary for the commonly known ultraviolet curable composition.

A surfactant-containing aqueous alkali solution may be used as a solution that, during printing, continuously cleans a roller that has wiped off an excess intaglio printing ink according to the present invention from the surface of the intaglio printing plate.

EXAMPLES

Example 1

The present invention is further illustrated by the following Examples that are not intended as a limitation of the invention. "Parts" and "%" are by mass unless otherwise specified.

<Production Example 1>

Production of acrylate that has two or more acryloyl groups and one carboxyl group in one molecule (A1)

430 parts of pentaerythritol acrylate (Aronix M306 manufactured by Toa Gosei Chemical Industry Co., Ltd.) as an acrylate that has two or more acryloyl groups and one carboxyl group in one molecule, 100 parts of succinic anhydride (Rikacid SA manufactured by New Japan Chemical Co., Ltd.) as a dibasic acid anhydride, 0.05 part of methylhydroquinone, and 0.5 part of N,N-dimehylbenzylamine were charged into a separable flask with a stirrer. A reaction was allowed to proceed at 80° C. for 4 hr while blowing air into the flask to obtain a product A1.

TABLE 1

Acrylate that has two or more acryloyl groups and one carboxyl group

| | Symbol of product | | | |
|---|---|---|---|---|
| | A1 | A2 | A3 | A4 |
| Acrylate that has one hydroxyl group | M306 | M306 | M306 | M403 |
| Dibasic anhydride | SA | MA | HH | SA |

Symbols in the table have the following respective meaning.
M306: pentaerythritol acrylate (Aronix M306 manufactured by Toa Gosei Chemical Industry Co., Ltd.)
M403: dipentaerythritol pentaacrylate (Aronix M403 manufactured by Toa Gosei Chemical Industry Co., Ltd.)
SA: succinic anhydride (Rikacid SA manufactured by New Japan Chemical Co., Ltd.)
MA: maleic anhydride
HH: hexahydrophthalic anhydride (Rikacid HH manufactured by New Japan Chemical Co., Ltd.)

<Production Example 2>

Production of Varnish (V1)

530 parts of A1 specified in Table 1 as an acrylate that has two or more acryloyl groups and one carboxyl group in one molecule, 186 parts of bisphenol A epoxy resin (jER828 manufactured by Japan Epoxy Resins Co., Ltd.) as an epoxy compound having two or more epoxy resins, 180 parts of polyethylene glycol 400 diacrylate (PEG400DA manufactured by Nippon Kayaku Co., Ltd.), 0.9 part of methylhydroquinone, and 1.8 parts of N,N-dimehylbenzylamine were charged into a separable flask with a stirrer, and a reaction was allowed to proceed at 115° C. for 16 hr while blowing air into the flask. 100 parts of succinic anhydride (Rikacid SA manufactured by New Japan Chemical Co., Ltd.) as a polybasic acid anhydride was added to the reaction product, and a reaction was further allowed to proceed at 80° C. for 4 hr. Polyethylene glycol 400 diacrylate (PEG400DA manufactured by Nippon Kayaku Co., Ltd.) was added thereto to give a viscosity of 1.5 Pa·s at 30° C. to obtain a varnish V1.

Varnishes V2 to V8 were obtained in the same manner as in Production Example 2. The details are summarized in Table 2.

TABLE 2

| | Varnish | | | | | | | |
|---|---|---|---|---|---|---|---|---|
| Symbol of varnish | V1 | V2 | V3 | V4 | V5 | V6 | V7 | V8 |
| Epoxy compound | jER828 | jER806 | jER152 | EX201 | EX810 | EX810 | jER152 | EX810 |
| Acrylate in Table 1 | A1 | A1 | A1 | A1 | A1 | A2 | A3 | A4 |
| Polybasic anhydride | SA | SA | SA | SA | SA | MA | HH | SA |

Symbols in the table have the following respective meaning.
jER828: bisphenol A epoxy resin (jER828 manufactured by Japan Epoxy Resins Co., Ltd.)
jER806: bisphenol F epoxy resin (jER806 manufactured by Japan Epoxy Resins Co., Ltd.)
jER152: phenol novolak epoxy resin (jER152 manufactured by Japan Epoxy Resins Co., Ltd.)
EX201: resorcin diglycidyl ether (EX201 manufactured by Nagase ChemteX Corporation)
EX810: ethylene glycol diglycidyl ether (EX810 manufactured by Nagase ChemteX Corporation)

Acrylates that have two or more acryloyl groups and one carboxyl group in one molecule (A2 to A4) were obtained in the same manner as in Production Example 1. The details are summarized in Table 1.

<Production Example of Comparative Varnish V9>

177 parts of a phenol novolak epoxy resin (jER152 manufactured by Japan Epoxy Resins Co., Ltd.), 72 parts of acrylic acid (manufactured by Osaka Organic Chemical Industry Ltd.), 0.25 part of methylhydroquinone, and 0.5 part of N,N-dimehylbenzylamine were charged into a separable flask with a stirrer, and a reaction was allowed to proceed at 120° C. for 24 hr while blowing air into the flask. 100 parts of succinic anhydride (Rikacid SA manufactured by New Japan Chemical Co., Ltd.) was added to the reaction product, and a reaction was further allowed to proceed at 80° C. for 3 hr, and polyethylene glycol 400 diacrylate (PEG400DA manufactured by Nippon Kayaku Co., Ltd.) was added to give a viscosity of 1.5 Pa·s at 30° C. to obtain varnish V9.

<Production Example of Comparative Varnish V10>

177 parts of a phenol novolak epoxy resin (jER152 manufactured by Japan Epoxy Resins Co., Ltd,), 72 parts of acrylic acid (manufactured by Osaka Organic Chemical Industry Ltd.), 0.25 part of methylhydroquinone, and 0.5 part of N,N-dimehylbenzylamine were charged into a separable flask with a stirrer, and a reaction was allowed to proceed at 120° C. for 24 hr while blowing air into the flask. 154 parts of hexahydrophthalic anhydride (Rikacid HH manufactured by New Japan Chemical Co., Ltd.) was added to the reaction product, and a reaction was further allowed to proceed at 80° C. for 3 hr. Polyethylene glycol 400 diacrylate (PEG400DA manufactured by Nippon Kayaku Co., Ltd.) was added thereto to give a viscosity of 1.5 Pa·s at 30° C. to obtain a varnish V10.

<Production Example of Inks Used in Experiments>

According to formulations shown in Table 3, the ingredients were kneaded with a three-roll mill, and an intaglio printing ink was produced by a conventional method.

TABLE 3

| Formulation of intaglio printing ink | | |
| --- | --- | --- |
| Ultraviolet curable composition | V1 to V10 | 55.3% |
| Oxidation polymerizable composition | Linseed oil-modified alkyd resin | 6.2% |
| Photopolymerization initiator | Irgacure 369 (manufactured by Ciba Specialty Chemicals Inc.) | 3.3% |
| Oxidation polymerization catalyst | Cobalt octylate | 1.0% |
| Pigment | Color organic pigment | 20.1% |
|  | Barium sulfate | 14.1% |

<Evaluation of Ultraviolet Curability>

Intaglio printing was carried out with an intaglio printing plate having a printing plate depth of 100 μm on a paper having a size of 65 mm×160 mm and a basis weight of 86 g/m². Immediately after printing, the paper was irradiated with ultraviolet light emitted from an ultraviolet lamp (one air cooling metal halide lamp (80 W/cm)) at a conveying speed of 10 to 40 m/min. A paper having the same size was placed on the above paper on its printed surface side. The papers were held between glass plates, and a load of 215 kg/m² was applied. After standing for one day, a tensile force necessary for pulling upon the superimposed paper from the printed paper was measured, and the maximum value was regarded as a blocking peel strength. The results are summarized in Table 4.

TABLE 4

| | Blocking peel strength (unit: g) | | | | | | | | | |
| --- | --- | --- | --- | --- | --- | --- | --- | --- | --- | --- |
| Printing speed | Example | | | | | | | | Comparative Example | |
| | V1 | V2 | V3 | V4 | V5 | V6 | V7 | V8 | V9 | V10 |
| 40 m/min | 15.2 | 22.0 | 21.3 | 13.6 | 14.9 | 14.9 | 48.0 | 10.8 | 244 | 290 |
| 20 m/min | 9.02 | 4.29 | 8.26 | 8.52 | 4.05 | 5.13 | 20.2 | 5.98 | 158 | 270 |
| 10 m/min | 1.39 | 1.49 | 3.66 | 2.04 | 1.35 | 1.67 | 7.47 | 2.31 | 30.8 | 112 |

In Comparative Example V9, the peel strength was 30.8 g at a printing speed (160 mJ/cm²) of 10 m/min, whereas, in Example varnishes V1 to V6 and V8 using succinic anhydride or maleic anhydride as the dibasic acid anhydride and polybasic acid anhydride, respectively, the peel strength was less than 30 g at a printing speed (40 mJ/cm²) of 40 m/min, indicating that the dose of the ultraviolet light could be reduced. In Example varnish V7 using hexahydrophthalic anhydride as the dibasic acid anhydride and the polybasic acid anhydride, the peel strength was less than 30 g at a printing speed (80 mJ/cm²) of 20 m/min that was superior to that in Comparative Example V9.

The invention claimed is:

1. An intaglio printing ink comprising:
   at least an ultraviolet curable composition;
   an oxidation polymerizable composition;
   a photopolymerization initiator;
   an oxidation polymerization catalyst; and
   a pigment;
   wherein the ultraviolet curable composition comprises an acid-modified epoxy-acrylate prepared by reacting a polybasic acid anhydride with an epoxy-acrylate obtained by reacting only an acrylate, having two or more acryloyl groups and one carboxyl group in one molecule, with an epoxy compound having two or more epoxy rings in one molecule,
   wherein the acrylate having two or more acryloyl groups and one carboxyl group in one molecule is an acrylate obtained by reacting pentaerythritol acrylate or dipentaerythritol pentaacrylate with succinic anhydride or maleic anhydride,
   wherein the polybasic acid anhydride is succinic anhydride or maleic anhydride,
   wherein the acid-modified epoxy-acrylate is obtained without removing (meth)acrylic acid residue after reacting the polybasic acid anhydride with the epoxy-acrylate, and
   wherein the acid-modified epoxy-acrylate is obtained by reacting the polybasic acid anhydride with the epoxy-acrylate in a ratio of substantially 1 molar of the polybasic acid anhydride to 1 molar of a hydroxyl group of the epoxy-acrylate.

2. A process for producing a printed matter by using the intaglio printing ink according to claim 1, comprising the steps of casting the intaglio printing ink on a printing plate and transferring the ink on a paper from the printing plate.

3. A printed matter obtained by the process according to claim 2.

* * * * *